(12) United States Patent
Stigwall et al.

(10) Patent No.: US 12,289,526 B2
(45) Date of Patent: Apr. 29, 2025

(54) METROLOGY SYSTEM

(71) Applicant: HEXAGON TECHNOLOGY CENTER GMBH, Heerbrugg (CH)

(72) Inventors: Johan Stigwall, St. Gallen (CH); Zheng Yang, Friedrichshafen (DE); Thomas Jensen, Rorschach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 232 days.

(21) Appl. No.: 18/078,514

(22) Filed: Dec. 9, 2022

(65) Prior Publication Data
US 2023/0188857 A1   Jun. 15, 2023

(30) Foreign Application Priority Data
Dec. 14, 2021  (EP) .................................... 21214456

(51) Int. Cl.
*H04N 23/695* (2023.01)
*G01S 17/66* (2006.01)
(Continued)

(52) U.S. Cl.
CPC .......... *H04N 23/695* (2023.01); *G01S 17/66* (2013.01); *G01S 17/89* (2013.01); *G06T 7/55* (2017.01);
(Continued)

(58) Field of Classification Search
CPC .... H04N 23/695; H04N 23/69; H04N 25/705; G01S 17/66; G01S 17/89; G01S 17/08;
(Continued)

(56) References Cited

U.S. PATENT DOCUMENTS

2006/0073307 A1* 4/2006 Rossner ................. E01F 9/524
                                                              427/64
2015/0029489 A1* 1/2015 Metzler ................ G01S 7/4812
                                                             356/4.01
(Continued)

FOREIGN PATENT DOCUMENTS

EP         0 553 266           8/1993
WO      2007/079600 A1         7/2007
(Continued)

OTHER PUBLICATIONS

Extended European Search Report dated Jun. 27, 2022 as received in Application No. 21214456.2.

*Primary Examiner* — Jared Walker
(74) *Attorney, Agent, or Firm* — Maschoff Brennan (57) ABSTRACT

A metrology system comprising a target object, a metrology instrument and a control unit configured for controlling an alignment of the targeting unit and for deriving an orientation of the target object. The metrology instrument comprises a zoom objective, an illumination unit and a time-of-flight sensor comprising an array of pixels and capable of providing range data for each pixel of the array as point cloud data, the time-of-flight sensor provides the distance measuring device. The control unit comprises an object determination functionality which provides receiving the point cloud data provided by the time-of-flight sensor, deriving a digital representation of the target object by processing the point cloud data, comparing the digital representation of the target object with a reference pattern of the target object, and determining the orientation of the target object based on the comparison of the digital representation of the target object with the reference pattern.

18 Claims, 4 Drawing Sheets

(51) Int. Cl.
　　*G01S 17/89*　　(2020.01)
　　*G06T 7/55*　　(2017.01)
　　*G06T 7/73*　　(2017.01)
　　*H04N 23/69*　　(2023.01)
　　*H04N 25/705*　　(2023.01)

(52) U.S. Cl.
　　CPC ............... *G06T 7/74* (2017.01); *H04N 23/69* (2023.01); *H04N 25/705* (2023.01); *G06T 2207/10028* (2013.01); *G06T 2207/30204* (2013.01)

(58) Field of Classification Search
　　CPC ...... G01S 7/481; G01S 7/4817; G01S 17/894; G06T 7/55; G06T 7/74; G06T 2207/10028; G06T 2207/30204; G01C 3/08
　　See application file for complete search history.

(56) References Cited

U.S. PATENT DOCUMENTS

| | | | | |
|---|---|---|---|---|
| 2015/0178412 | A1* | 6/2015 | Grau | G01B 21/047 703/1 |
| 2018/0135969 | A1* | 5/2018 | Vandenhoudt | G01S 3/783 |
| 2019/0033461 | A1* | 1/2019 | Wingert | G06T 7/0006 |
| 2020/0309515 | A1* | 10/2020 | Lüthi | H04N 23/56 |
| 2021/0025978 | A1* | 1/2021 | Luthi et al. | G01S 17/66 |

FOREIGN PATENT DOCUMENTS

| | | | | |
|---|---|---|---|---|
| WO | 2010/148525 | A1 | 12/2010 | |
| WO | WO-2021069079 | A1 * | 4/2021 | ........... G01B 11/005 |

\* cited by examiner

METROLOGY SYSTEM

BACKGROUND

The disclosure relates generally to a metrology system and a metrology instrument to provide accurate determination of orientation of a target object.

In metrology it is a general object to determine geometrical properties such as coordinates, distances, and orientations of one or more target objects relative to a metrology device, wherein in most instances those properties have to be determined with respect to a known reference system, e.g. defined by one or more known reference points.

Methods and systems for measuring target coordinates are used in many applications, e.g. very precise measurements in geodesic applications, measurement problems in the field of building installation, or for controlling industrial processes.

Metrology instruments that are designed for continuously tracking a target point and coordinatively determining the position of this point can generally be combined under the term laser tracker, particularly in connection with industrial metrology. In this case, a target point may be represented by a retroreflective unit (e.g. cube prism) that is targeted using an optical measurement beam from the measuring instrument, particularly a laser beam. The laser beam is reflected back to the measuring apparatus in a parallel manner, the reflected beam being sensed using a sensing unit of the apparatus. In this context, an emission direction and a reception direction for the beam are ascertained, for example by means of sensors for angle measurement that are associated with a deflection mirror or a targeting unit of the system. In addition, with the sensing of the beam, a distance from the measuring apparatus to the target point is ascertained, e.g. by means of propagation time measurement or phase difference measurement.

In addition, laser trackers according to the prior art may be embodied with an optical image capture unit with a two dimensional, light-sensitive array, e.g. a CCD camera or a camera based on a CMOS array, or with a pixel array sensor and with an image processing unit. In this case, the laser tracker and the camera may be mounted in particular one on top of the other such that their positions relative to one another cannot be altered. Alternatively, the camera is arranged so as to be able to rotate together with the laser beam. The camera may be installed in an integrated design together with the laser optical system in a common housing.

With a capture and evaluation of an image—by means of an image capture and image processing unit—of what is known as an auxiliary measuring instrument (probe) with markings whose relative location with respect to one another is known, it is possible to deduce an orientation for a known object (probe). Together with the determined spatial position of the target point, it is furthermore possible to precisely determine the position and orientation of the object with six degrees of freedom (6DoF).

The probe can be embodied by what are known as a contact sensing tool that is positioned with its contact point on a point of an object to be measured. The contact sensing tool has markings, e.g. light points, and a reflector, which represents a target point on the contact sensing tool and can be targeted using the laser beam from the tracker, the positions of the markings and of the reflector relative to the contact point of the contact sensing tool being precisely known. In a manner known to a person skilled in the art, the probe may also be a, for example handheld, scanner equipped for distance measurement for contactless surface surveying operations, the direction and position of the scanner measurement beam used for the distance measurement relative to the light points and reflectors that are arranged on the scanner being precisely known. Such a scanner is described in EP 0 553 266, for example.

For distance measurement, laser trackers in the prior art have at least one distance measuring device, said distance measuring device typically being in the form of a laser interferometer, for example. Due to comparatively long coherence length and the measurement range permitted thereby, the interferometers used for distance measurement primarily comprise helium neon gas lasers (HeNe lasers) as light sources. Such is known from WO 2007/079600 A1 or from WO 2010/148525 A1, for example.

A disadvantage of laser trackers in the prior art is the need of complex measuring systems in order to provide an accurate full 6DoF determination of an object in a continuous manner. Moreover, in order to provide stable measuring conditions by use of a HeNe laser complex, voluminous, and energy consuming calibration and stabilisation component are required.

SUMMARY

It is therefore an object of the disclosure to provide a metrology system that is improved in comparison with the prior art.

A further object of the present disclosure is to provide a tracking system which provides more compact design and less complexity with respect to its measuring components.

One aspect relates to a new generation of metrology systems which allow to omit a laser source for tracking and for measuring a distance to an object to be tracked with high precision. For this, such metrology instrument may no longer be named "laser tracker" but only "tracker", "metrology tracker" or "metrological tracker".

A metrology system comprises a target object, in particular a measuring probe, a coordinate measuring machine, a robot, a triangulation scanner or a projection scanner, and a metrology instrument for tracking the target object and/or for determining at least an orientation of the target object. In particular, the target object can furthermore be provided by a probing or scanning device configured to approach the object and to carry out at least one of a tactile, a laser based, and a camera based coordinate measurement. As for example, the target object can be a marking device configured to mark an object, a tool and/or manufacturing instrument, a stereo-imaging camera, an articulated arm robot, a white light sensor or a laser scanner.

The metrology instrument comprises a base unit, a support unit mounted on the base unit and configured for being rotatable relative to the base unit around a yaw axis, a targeting unit mounted on the support unit and configured for being rotatable relative to the support unit around a pitch axis, an angle determining unit configured to provide angle determination data for determining an alignment of the targeting unit and a distance measuring device configured to provide distance data with respect to the target object. In particular, the yaw axis is perpendicular to the pitch axis.

The metrology system furthermore comprises a control unit configured for controlling an alignment of the targeting unit and for deriving at least an orientation of the target object. The control unit may be arranged at the metrology instrument, at the target object or may be built as a separate component. In particular, the control unit may be provided by a computer or a laptop, a tablet computer, a smart phone or video glasses, particularly wherein the control unit is configured to work with augmented reality technology.

The metrology instrument comprises a zoom objective, an illumination unit and a time-of-flight sensor (ToF). The time-of-flight sensor comprises an array of pixels and is capable of providing range data for each pixel of the array. The data provided by the array of pixels is preferably provided in form of a point cloud data. The time-of-flight sensor provides the distance measuring device of the metrology instrument.

The zoom objective, the illumination unit and the time-of-flight sensor are arranged so that an optical axis of the zoom optics, an optical axis of the illumination unit and an optical axis of the time-of-flight sensor are coaxially arranged and an orientation of the coaxial axes is alignable by means of the targeting unit. This means that there is one common aiming axis which can be directed and the orientation of which can be varied by aligning the targeting unit. Coaxial arrangement of the axes may be provided by coupling the optical axes by means of half-reflecting mirrors or 45-degree mirror. In case the illumination unit is embodied as a ring of emitters, its optical axis is preferably defined by the centre of the ring.

The target object provides particular characteristics at the target object, in particular which characteristics allow to identify the target object and which—when imaged from a particular direction—at least allow to determine an orientation of the object based on their appearance in a respective image.

The control unit comprises an object determination functionality which, when executed, provides receiving the point cloud data provided by the time-of-flight sensor, deriving a digital representation of the target object by processing the point cloud data, comparing the digital representation of the target object with a reference pattern of the target object, the reference pattern is related to the characteristics of the target object, and determining the orientation and/or position of the target object based on the comparison of the digital representation of the target object with the reference pattern.

Hence, the metrology system provides acquiring a comparatively large number of range (distance) data for an object to be measured. The range data comprises information about distances between the metrology instrument and particular measuring points at the object. Such range data is provided as a point cloud. Since the points of the point cloud are provided with high density the point cloud allows to describe the object to be measured accurately. Based on the acquired range data a digital model of the object (digital representation) can be computed. In particular, the digital model relates to the part of the target object which can be observed (is visible) from the metrology instrument.

The object to be measured is a known target object as described above. Particular characteristics of the object are known as well. Accordingly, a reference model (reference pattern) of the target object may be provided to the system, e.g. may be stored on the system or may be accessible on a remote server. Such reference pattern provides a description of the target object, in particular with respect to a shape and dimension of the object. The reference pattern of the target object may be provided as a point cloud. In particular, the target object is designed so that its characteristics allow to unambiguously identify an orientation of the object relative to the metrology instrument based on a particular set of characteristics which are observable (visible) from the point of view of the metrology instrument.

Having accurate information about entire characteristics of the target object as well as about a particular portion of these characteristics which are detected on side of the time-of-flight sensor an actual orientation of the target object can be derived by comparing an actual digital representation (which comprises said particular visible portion of the characteristics) with the reference model. As for example, the actual digital representation is rotated and/or translated so that is fits best the reference model and a respective translation matrix is derived. The amounts of rotation and translation can directly provide the actual orientation of the object.

In one embodiment, the characteristics of the target object can be provided by a shape and/or a dimension of the target object as already mentioned above.

In particular, the characteristics of the target object can be provided by an asymmetrical shape or form of the target object, and/or by particular orientation elements which are arranged at the target object. As for example, such orientation elements can be randomly or uniformly distributed over the target object and/or may comprise individually different dimensions and/or shapes. Alternatively or additionally, the characteristics of the target object can be provided by actively blinking characteristics or colour of the probe.

In particular, at least one of the characteristics can be formed and arranged at the target object so that a defined reference point is defined by the at least one characteristic. The defined reference point can provide a reference position relating to the target object. In other words, an observation of such particular characteristic may allow to directly derive one defined reference position at the object. Detection of at least three such characteristic may therefore provide three particular reference positions at the object and may provide an orientation of the object by knowledge of those three positions.

Concerning the characteristics of the target object, at least one of the characteristics, in particular at least one orientation element, can comprise an ellipsoidal, parabolic, curved, pyramidal, cone, spherical or other shape. Alternatively or additionally, at least one of the characteristics, in particular at least one orientation element, can be embodied as a spherical or half-spherical body which provides (defines) a spherical or half-spherical elevations and/or depressions at the target. For instance, in case an orientation element is embodied as a sphere or half-sphere a respective centre point of the sphere can be derived upon identification of the sphere.

In particular, the reference point can be a geometric focal point or a geometric centre point geometrically defined by the shape of the at least one characteristic, in particular the reference point is the centre point of a spherical or half-spherical elevation and/or depression at the target object.

In one embodiment, the object determination functionality can provide computing of a digital model of at least a part of the target object based on the point cloud data, the computed digital model is the digital representation of the target object. Such computing can be performed when running the object determination functionality. The model may be computed by meshing the point cloud.

In one embodiment, the object determination functionality can provide fitting of the computed digital model to the reference pattern with respect to an orientation of the computed digital model, in particular also with respect to a scaling of the computed digital model. Fitting may in particular be performed with respect to an initial relative orientation and/or scaling of the computed digital model relative to the reference pattern. Such fitting can be performed when running the object determination functionality.

According to an embodiment, the object determination functionality provides information about an orientation of the target object based on the fitting of the computed digital model, in particular an orientation with reference to the metrology instrument.

In an embodiment, when executed, the object determination functionality can provide determining a transformation matrix based on the fitting, the transformation matrix provides information about an orientation of the target object, in particular an orientation with reference to the metrology instrument.

In one embodiment the fitting of the computed digital model can comprise:
- identifying and extracting particular characteristics of the target object based on the point cloud data or based on the computed digital model,
- deriving a number of fitting points related to the identified and extracted particular characteristics, in particular deriving focal points and/or centre points of ellipsoidal, parabolic and/or spherical shaped characteristics representing the fitting points, and
- fitting the fitting points to respective pattern reference points provided by the reference pattern.

As for example, a set of particular characteristics at the target object may be determined based on the acquired point cloud data. Each of such characteristic may define a particular fitting point (e.g. centre point of an identified sphere). Fitting may then be performed to find a best fit between the defined fitting points and pattern reference points known for the target object.

Fitting may be understood to provide minimizing the deviation between the measured- and reference points e.g. by rigid 6DOF transformation.

In one embodiment, a digital reference model of at least a part of the target object can be provided as the reference pattern, wherein the digital reference model provides information about dimension and/or shape of the target object, in particular about dimensions and shapes of the characteristics and their positions at the target object.

According to an embodiment, the digital reference model can provide the pattern reference points and fitting of the computed digital model is performed with respect to the digital reference model, in particular wherein the pattern reference points provide positions of focal points and/or centre points of ellipsoidal, parabolic and/or spherical shaped characteristics with respect to the target object.

In one embodiment, the target object can comprise a high-reflectivity coating, the high-reflectivity coating is designed to reflect light emitted by the illumination unit, in particular wherein the high-reflectivity coating comprises retro-reflecting glass powder, in particular wherein at least one particular characteristic of the target object comprises the high-reflectivity coating.

By applying the high-reflectivity coating less noise (SNR, signal to noise) of the measuring data can be achieved due to increased reflecting quality (strength). This results in more reliable and precise measuring results.

According to an embodiment, the object determination functionality, when executed, can provide deriving a distance between the metrology instrument and the target object by processing of the point cloud data. The distance can be derived e.g. by use of one particular range signal of the time-of-flight sensor or by averaging a number of distance information provided by the point cloud.

In an embodiment, the object determination functionality provides deriving six degrees of freedom (6DOF) of the target object by processing of the point cloud data, i.e. orientation and position of the target object can be derived.

In an embodiment, the target object can comprise a set of 2D markers and the metrology instrument can comprises an image sensor, in particular wherein the image sensor is provided by the time-of-flight sensor. The control unit can comprise a coarse orientation determination functionality which, when executed, provides capturing a marker image of at least a part of the set of 2D markers, processing the marker image and determining marker image positions for the captured markers and deriving an orientation of the target object relative to the metrology instrument based on the marker image positions.

The 2D markers can be asymmetrically located at the target object. The makers may be located randomly or pseudo-randomly, regular with one or more markers missing or regular plus additional index marker(s) in non-regular position(s). Additionally or alternatively, at least one of the 2D markers may be provided with attached index coding. At least one of the 2D markers may be a ring around a dot comprising e.g. a barcode. At least one of the 2D markers may be a QR code an index marker having different diameter, an index marker having different shape or an asymmetric marker (e.g. triangle or square). Additionally or alternatively, at least one of the 2D markers can be a blinking or self-illuminated marker.

The disclosure also relates to a metrology instrument for tracking a target object and/or for determining at least an orientation of the target object. The metrology instrument comprises a base unit, a support unit mounted on the base unit and configured for being rotatable relative to the base unit around a yaw axis, a targeting unit mounted on the support unit and configured for being rotatable relative to the support unit around a pitch axis, an angle determining unit configured to provide angle determination data for determining an alignment of the targeting unit, a distance measuring device configured to provide distance data with respect to the target object and a control unit configured for controlling an alignment of the targeting unit and for deriving at least an orientation of the target object.

The metrology instrument comprises a zoom objective, an illumination unit and a time-of-flight sensor. The time-of-flight sensor comprises an array of pixels and is capable of providing range data for each pixel of the array as point cloud data, the time-of-flight sensor provides the distance measuring device. The zoom objective, the illumination unit and the time-of-flight sensor are arranged so that an optical axis of the zoom optics, an optical axis of the illumination unit and an optical axis of the time-of-flight sensor are coaxial and an orientation of the coaxial axes is alignable by means of the targeting unit.

The control unit comprises an object determination functionality which, when executed, provides receiving the range data providable by the time-of-light sensor as point cloud data, deriving a digital representation of the target object by processing the point cloud data, comparing the digital representation of the target object with a reference pattern, the reference pattern providing particular characteristics of the target object, and determining an orientation of the target object based on the comparison of the digital representation of the target object with the reference pattern.

The TOF sensor can provide an image, in particular a grey (intensity) image, like a normal image sensor.

In an embodiment the metrology instrument can be a tracker and the control unit comprises a tracking functionality which, when executed, provides tracking a movement of the target object by continuously processing the point cloud data and providing respective tracking information and controlling the alignment of the targeting unit based on the tracking information so that the object maintains at least partly in a field of view of the time-of-light sensor.

In an embodiment at least the zoom objective and the time-of-light sensor can provide a defined measuring range for measuring and/or tracking the target object and the control unit comprises a zooming functionality which, when executed, provides for each distance out of the defined measuring range varying a magnification factor of the zoom objective as a function of the distance to the target object so that the target object is imaged onto the time-of-light sensor so that a dimension of the image of the target object on the time-of-light sensor remains basically constant.

The disclosure also relates to a method for determining at least an orientation of a target object by means of a tracker, the method comprises emitting illumination light towards the target object along an optical axis, coaxially receiving illumination light reflected by the target object along the optical axis, capturing a time-of-flight image of the target object by means of the reflected illumination light, the time-of-flight image comprises image information related to the target object, the image information comprises a defined amount of pixels, and the time-of-flight image comprises range data related to the target object, wherein a distance is provided for each pixel of the defined amount of pixels. Point cloud data is provided based on the range data, a digital representation of the target object is derived by processing the point cloud data, the digital representation of the target object is compared with a reference pattern, the reference pattern provides particular characteristics of the target object, and an orientation of the target object is determined based on the comparison of the digital representation of the target object with the reference pattern.

The disclosure also relates to a computer program product comprising program code which is stored on a machine-readable medium or is embodied by an electromagnetic wave comprising a program code segment, and has computer-executable instructions for performing, in particular when run on a control unit of a metrology system or instrument of above, at least the following steps:
  receiving point cloud data provided by a time-of-flight sensor,
  deriving a digital representation of a target object by processing the point cloud data,
  comparing the digital representation of the target object with a reference pattern, the reference pattern provides particular characteristics of the target object, and
  determining an orientation of the target object based on the comparison of the digital representation of the target object with the reference pattern.

BRIEF DESCRIPTION OF THE DRAWINGS

Aspects are described or explained in more detail below, purely by way of example, with reference to working examples shown schematically in the drawing. Identical elements are labelled with the same reference numerals in the figures. The described embodiments are generally not shown true to scale and they are also not to be interpreted as limiting. Specifically.

DETAILED DESCRIPTION

Figure 1:
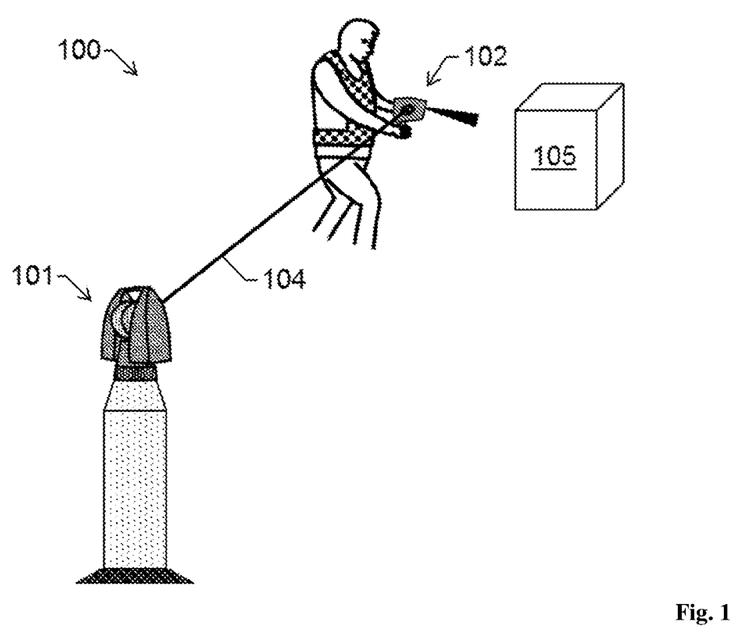
FIG. 1: illustrates a metrology system according to prior art.

FIG. 1 illustrates a metrology system 100 according to prior art. The figure shows an example use case, e.g. measuring and quality control of a work piece 105 e.g. in industrial automobile or aircraft production.

A typical metrology measurement system for determining 3D coordinates of an object 105 comprises a coordinate measuring device 101 with tracking functionality, in the following also referred to as a laser tracker, configured to automatically track a movable accessory device 102 and to generate coordinate measuring data indicative of the position, and often also the orientation, of the movable accessory device. For example, the tracking capability of the tracker may be provided by at least one of a video tracking unit, a radio frequency tracking unit, and by optical tracking based on emitting a tracking beam towards a cooperative target.

The movable accessory device 102 is configured for scanning the object 105, e.g. by means of tactile scanning, and/or laser based scanning, and/or camera based scanning, and/or the movable accessory device is configured for carrying out an intervention on the object 105, e.g. for manufacturing and/or marking the object 105. For example, the movable accessory device 102 may be embodied as scanning device configured to approach the object and to carry out a coordinate measurement itself, e.g. wherein the mobile accessory device is a hand-held scanner 102. Alternatively, the device may be a tactile probing or scanning device, an articulated arm robot, an x-ray inspection device, or a stereo imaging device. The mobile accessory device may also be a marking device for marking the object or a tool and/or manufacturing instrument. Furthermore, the accessory device can also be a further laser tracker, e.g. a laser tracker configured to have a scanning functionality.

Metrology systems are often configured that coordinate measuring data of accessory devices are typically referenceable to the coordinate system of one of the coordinate measuring devices, e.g. one of the fixed laser trackers, or to an outer coordinate system of a group of coordinate measuring devices.

By way of example, the movable accessory device 102 is embodied as a handheld scanner configured to emit a local scanning beam in order to scan the object surface in a local coordinate system, wherein the position of the handheld scanner 102 is tracked and measured by a laser tracker 101, and the measuring points of the handheld scanner 102, typically coordinate measuring data in a local coordinate system, are referenceable to the coordinate system of the laser tracker 101.

Both the movable accessory device 102 and the tracker 101 may also be mounted to a robot, e.g. a UGV ("unmanned ground vehicle") carrying a tracker 101 or a UAV ("unmanned aerial vehicle") carrying a photogrammetry camera.

By way of example, the tracker is embodied as an industrial laser tracker 101, which provides for high-precise coordinate measuring and tracking of a cooperative target at the probe 102, e.g. a passive reflecting unit with defined reflecting properties such as a steel sphere of known dimensions or a retro-reflecting unit such as a cubic prism, wherein at least parts of a laser beam emitted by the laser tracker 101 are reflected back, e.g. in parallel, to the laser tracker. Alternatively, the cooperative target may be an active unit emitting radiation having defined emission properties and/or according to a defined radiation pattern, e.g. provided by one or multiple laser diodes or LEDs, which is identified by the tracking unit of the coordinate measuring device. In other words: In the context of the present application, the term "cooperative target" relates to a target specifically foreseen to be used in conjunction with a tracking unit in order to enable generation of a tracking signal. Thus, the cooperative target "cooperates" with the tracking unit in that it has at least one of distinct reflection properties, distinct emission properties, a known shape, and known dimensions.

The basic structure of a typical laser tracker 101 comprises an opto-electronic distance meter to determine a distance to an object based on a laser measuring beam 104, wherein the aiming direction of the laser measuring beam 104 can be varied in a motorized movement, e.g. with respect to one or more independent spatial directions.

Opto-electronic laser distance meters have now become standard solutions in many areas, wherein various principles and methods are known in the field of electronic or electro-optical distance measurement. One approach is to use an interferometric distance measuring principle, particularly an absolute (i.e. frequency scanning) interferometry method, a frequency modulated continuous wave method (FMCW, particularly C-FMCW), the Fizeau principle, and/or a frequency comb principle.

Furthermore, the laser tracker 101 comprises a tracking unit for providing an automatic adjustment of the aiming direction of the laser measuring beam 104 such that the measuring beam 104 is continuously tracking a target point, wherein a direction of the emission of the laser measuring beam 104 is determined by means of sensors for angle measurement, e.g. angle encoders. As tracking sensor, a position-sensitive detector (PSD) may be used, e.g. an area sensor which functions in an analogue manner with respect to position, with the aid of which a centroid of a light distribution on the sensor surface can be determined.

The movable accessory device 102 may have some markers (not shown) for pose determination and the tracker may have an orientation camera (not shown), wherein the tracker is configured to determine an orientation of the movable accessory 102 device by means of image processing. Often, the movable accessory device 102 also has additional pose determination means, e.g. an inertial measurement unit and/or a visual inertial system, and is configured for wireless communication with the tracker.

Based on orientation and position determination, a pose (6 degrees of freedom, i.e. position and orientation) of the probe 102 can be determined.

It goes without saying that a skilled person will recognize that individual aspects of the metrology systems and metrology instruments described herein can be combined with each other.

Figure 2:
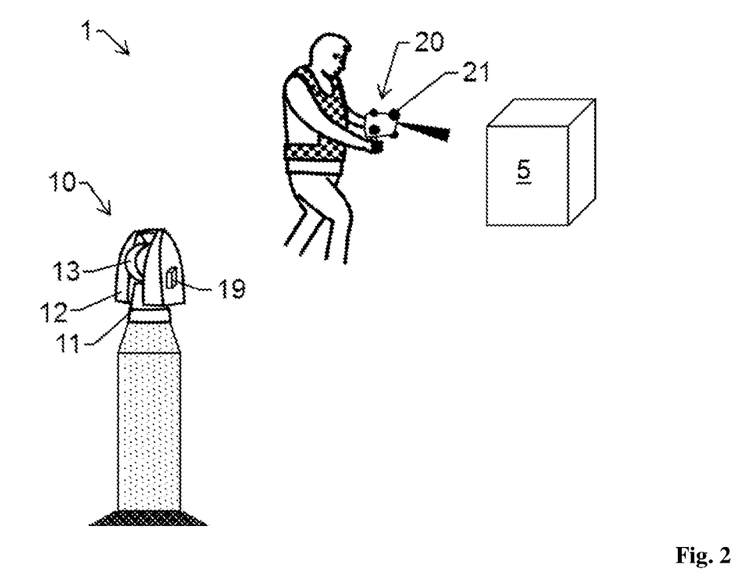
FIG. 2: shows an embodiment of a metrology system.

FIG. 2 illustrates an embodiment of a metrology system 1. The metrology system 1 provides a metrology instrument 10 and a target object 20 to be measured with the metrology instrument 10. In one embodiment, the metrology instrument 10 is a laser tracker and the target object 20 is a handheld scanning device (probe) as shown in FIG. 2.

The target object 20 comprises a set of characteristics 21. The characteristics 21 of the probe 20 provide a known asymmetric geometry of the probe and by that an unambiguous 3D rigid transformation for determining an orientation of the probe (see below).

The metrology instrument 10 can be configured to provide tracking of the target object 20 and to provide determining at least an orientation of the target object. The metrology instrument 10 here comprises a base unit 11, a support unit 12 mounted on the base unit 11 and configured for being rotatable relative to the base unit 11 around a yaw axis and a targeting unit 13 mounted on the support unit 12 and configured for being rotatable relative to the support unit 12 around a pitch axis. The metrology instrument 10 furthermore may comprise an angle determining unit configured to provide angle determination data for determining an alignment of the targeting unit 13 and a distance measuring device configured to determine a distance between the metrology instrument 10 and the target object 20.

The system 1 comprises a control unit 19. The control unit 19 can be arranged on side of (inside of) the metrology instrument 10 or the target object 20. The control unit can alternatively be provided in separate manner, e.g. by a particular device which is connected, in particular wirelessly, to the metrology instrument 10 and the target object 20 for exchanging information and data. In particular, the control unit can be provided by a computational data cloud. The control unit is at least configured to control an alignment of the targeting unit and to derive at least an orientation of, and in particular a distance to, the target object.

Figure 3:
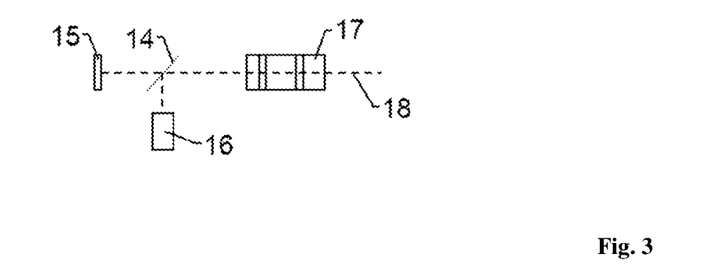
FIG. 3: shows an optical system of a metrology instrument.

The metrology instrument comprises an optical system having a zoom objective 17, an illumination unit 16 and a time-of-flight sensor 15 (ToF), see FIG. 3. The ToF 15 comprises an array of pixels and is capable of providing range data (distance value) for each pixel. By such amount of distance data a point cloud data is provided. The time-of-flight sensor 15 provides the distance measuring device of the metrology instrument 10.

The zoom objective 17, the illumination unit 16 and the time-of-flight sensor 15 are arranged so that an optical axis of the zoom optics, an optical axis of the illumination unit and an optical axis of the time-of-flight sensor are coaxially provided as a targeting axis 18 (see FIG. 3). A half-reflecting mirror provides coupling the optical axes of the time-of-flight sensor and the illumination unit.

The illumination unit can comprise a collimating optics and a light source. The light source can be an LED or laser emitting light with wavelength between 400 nm and 2 μm. The TOF measurement can be performed either incoherently or coherently. For incoherent TOF measurement, the light source can be configured to send either pulse train or sinusoidal intensity modulated light. For coherent TOF measurement the light source can provide sending wavelength swept light, which can partly be sent to a local oscillator and partly to the object. The light reflected from object interferes with the light from the local oscillator to generate beat signal. The distance of object is proportional to the frequency of detected beat signal.

The optical system and the targeting unit 13 are arranged relative to another so that an orientation of the coaxial axes 18 is alignable by means of the targeting unit. According to the example of FIG. 2, the optical system is integrally arranged in the targeting unit 13.

The control unit 19 comprises an object determination functionality. The object determination functionality is configured to provide—when executed—receiving the point cloud data provided by the time-of-flight sensor and deriving a digital representation of the target object by processing the point cloud data.

In other words, the target object 20 is illuminated by the illumination device 16 and an image of the illuminated target object 20 is captured by the ToF sensor 15. By that, the ToF sensor 15 provides at least a plurality of range data representing particular distances between the instrument 10 and the target 20. The plurality of range data forms a point cloud concerning the target object 20. Such point cloud data is provided or transmitted (from the ToF sensor) to the control unit 19.

The control unit provides processing of the point cloud data in a manner as to derive the digital representation of the target object 20, in particular wherein a digital model of the target object 20 is generated by computing. The digital model represents the digital representation.

Since the target object 20, its shape and dimensions as well as the characteristic elements 21 at the target object 20 are well known with respect to particular dimensions, shapes and positions at the target, a respective (digital) reference pattern can be provided. The reference pattern describes the target object 20 or elements thereof in a way which allows to clearly identify the target based on the pattern information. The pattern can be provided as a reference digital 3D model of the target object 20 or as a model referencing locations and/or shapes of the characteristics with respect to the target 20.

The object determination functionality furthermore comprises comparing the digital representation of the target object 20, e.g. the point cloud based digital model of the target object 20, with the reference pattern of the target object. Due to the fact that the characteristics of the target object 20 are provided so that the object provides particular asymmetry, an appearance of the target object 20 (in one particular direction towards the measuring instrument 10) is unique for each spatial orientation of the object 20. The other way round, based on a given three dimensional appearance of the object 20 an orientation of the object 20 can be determined. A three dimensional appearance of the target object 20 is provided by the calculated model of the target object 20.

Figure 4A:
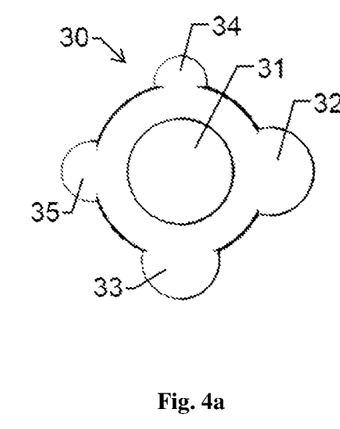
FIG. 4a-c: show an embodiment of a target object or of a particular characteristic which is arranged at an object be tracked in different orientations.
Figure 4B:
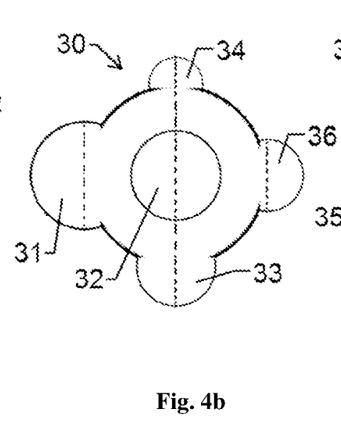
Figure 4C:
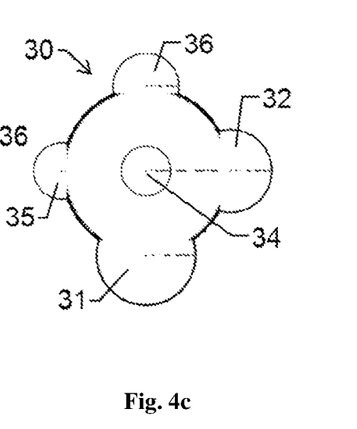

FIGS. 4a-c show an embodiment of a target object 30 or of a particular characteristic which is arranged at an object be tracked. The object 30 comprises a number of spherical elevations 31-36. The elevations 31-36 can be considered to be characteristics of an object which allow to precisely determine an orientation of the object independently from a current orientation of the object. Such unambiguous orientation determination is provided by arranging the characteristics 31-36 with different dimensions at particular positions around the target object 30.

FIG. 4a shows the target object 30 in a first orientation. FIG. 4b shows the target object 30 rotated by 90° around a vertical axis—the positions of the elevations 34 and 33 remain constant. FIG. 4c shows the target object 20 of FIG. 4a rotated by 90° around a horizontal axis—the positions of the elevations 35 and 32 remain constant.

Using the ToF sensor 15 for measuring a target object 20 or 30 provides a point cloud which allows to recognise and determine each of the characteristics which is in the field of view of the sensor and which is not occluded (e.g. because located at the backside of the target object). In contrast to common image detection not only edges of the target object 20 or 30 can be extracted by image processing but also elements (characteristics) with particular topographic e.g. in an object centre can be determined by modelling. For instance, the characteristic spherical elevation 32 of FIG. 4b can be modelled based on a respective point cloud.

The object determination functionality makes use of these particular properties of the target object 20 and its characteristics and provides determining the orientation of the target object based on the comparison of the digital representation of the target object with the reference pattern.

Comparing the digital representation of the target object with the reference pattern can comprise to use a three dimensional reference model of the target object and to derive a measured model of target object from the point cloud. The measured model of the target object can be numerically transformed so that the modelled target object fits best to the reference model. An orientation of the target object 20 or 30 can then be derived from a respective (4×4) transformation matrix which is provided by the best-fit transformation of the modelled target object. The 4×4 matrix can be used directly to transform the local coordinates from the probe (object) to the tracker reference system.

The TOF sensor can be used also for position determination and thus provide 6DOF position & orientation of the object.

The reference model of the target object may be derived by high-precise coordinate measurement of the real target object, e.g. by means of a coordinate measuring machine (CMM) having tactile and/or optical measuring means. By that, a dense point cloud of the target object can be acquired and the reference model can be calculated based on that point cloud.

Figure 5A:
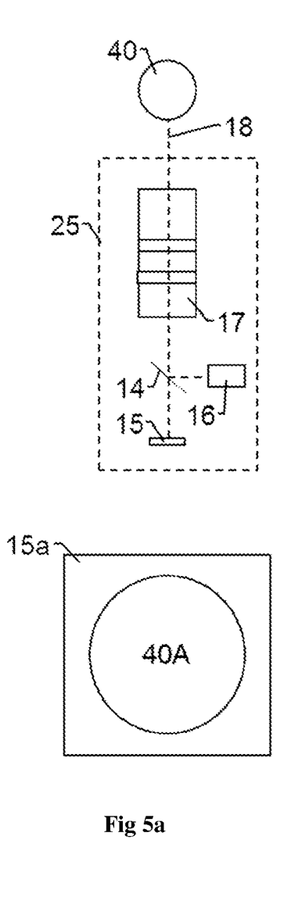
FIG. 5a-b: show an embodiment of imaging a target object and acquiring range data for the target object with a metrology system.
Figure 5B:
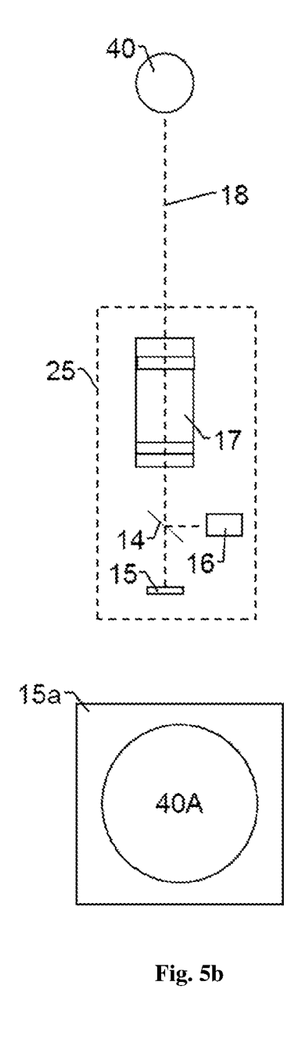

FIGS. 5a and 5b show an embodiment of imaging a target object 40 and acquiring range data for the target object 40 with a metrology system.

The optical system 25 of the metrology instrument again comprises a ToF sensor 15, a half-reflecting mirror 14, an illumination unit 16 and an optical vario (zoom) objective 17. Also shown is a detecting area 15a of the ToF sensor 15. A field of view of the metrology instrument is defined at least by the particular arrangement of the sensor 15 and the objective 17 as well as by a particular zoom setting of the objective 17. However, is to be understood that additional optical elements like a lens, an aperture, a beam splitter etc. may be arranged along the optical axis 18 and may influence the dimension of the field of view, i.e. an aperture angle.

The combination of the zoom objective 17 and the time-of-light sensor 15 also provides a defined measuring range for measuring and/or tracking the target object 40. The measuring range can be understood to be a range between a minimum allowable distance and a maximum allowable distance to the target object 40 within which a reliable and precise distance and/or image determination of the target object 40 can be provided.

The metrology system comprises a zooming functionality which, when executed, provides for each distance out of the defined measuring range varying a magnification factor of the zoom objective 17 as a function of the distance to the target object so that the target object is imaged onto the time-of-light sensor so that a dimension of the image 40A of the target object on the time-of-light sensor 15a remains basically constant.

FIG. 5a shows the target object 40 in a first (near) distance to the metrology instrument. The zoom objective 17 is adjusted so that the object 40 is imaged onto the sensor 15 to cover a main region of the detecting area 15a for providing a large amount of distance date related to the target object 40.

FIG. 5b shows the target object 40 in a second (far) distance to the metrology instrument. However, the zoom objective 17 is again adjusted so that the object 40 is imaged onto the sensor 15 to cover the main region of the detecting area 15a for still providing a large amount of distance date related to the target object 40.

By applying such a zoom adjustment, a substantially constant amount of range data which is directly related to the target object 40 can be provided irrespective of a current distance between the sensor 15 and the target object 40. Hence, such a zoom functionality is advantageous in light of deriving a model of the target object 40 and comparing the model to a known pattern. The database for computing the model remains more or less constant for each distance in the defined measuring range. Since the model can be derived with substantially constant precision (resolution) the succeeding fitting process can also be performed with improved constant reliability.

A current zoom setting or zoom factor can be adjusted based on a measured distance to the target object 40 by means of the ToF sensor 15. Such measurement may be provided in comparatively coarse manner, wherein only one range value or an average distance to the object 40 may be used to adjust the zoom objective 17. The adjustment of the zoom objective 17 may be performed continuously.

Figure 6A:
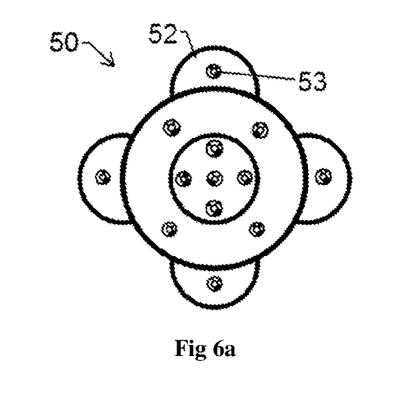
FIG. 6a-b show embodiments of target.
Figure 6B:
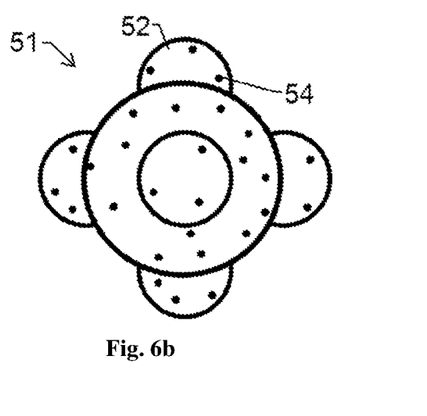

FIGS. 6a and 6b show further embodiments of target objects 50 and 51 having particular characteristic 52 arranged at the objects 50,51 to provide defined three dimensional shapes of the objects. The objects 50,51 also comprise a number of 2D coded pattern 53,54 at their characteristic 52. Such 2D markers 53,54 can provide to derive a (coarse) alignment (orientation) of the target 50,51 relative to a metrology instrument and thus to determine a course alignment (orientation) between a representation of the target object (digital model of the target) and a reference pattern of the target object (reference model). The coarse alignment can be derived based on image processing of an captured image of one of the target objects 50 and 51.

Figure 7A:
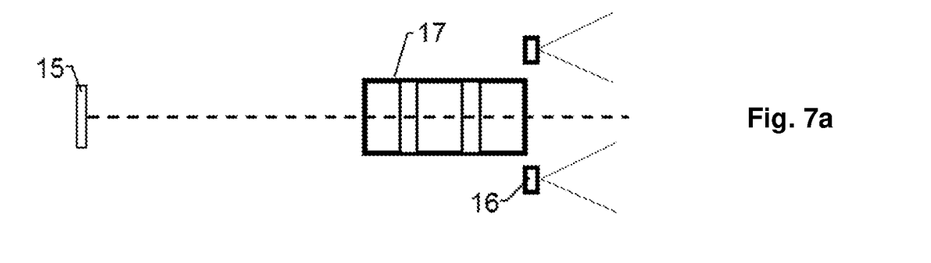
FIG. 7a-c show optical systems of metrology instruments.
Figure 7B:
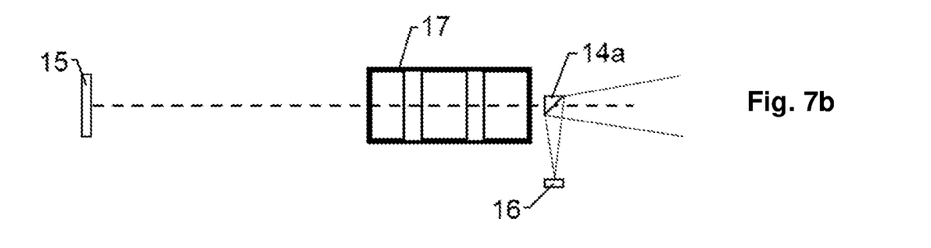
Figure 7C:
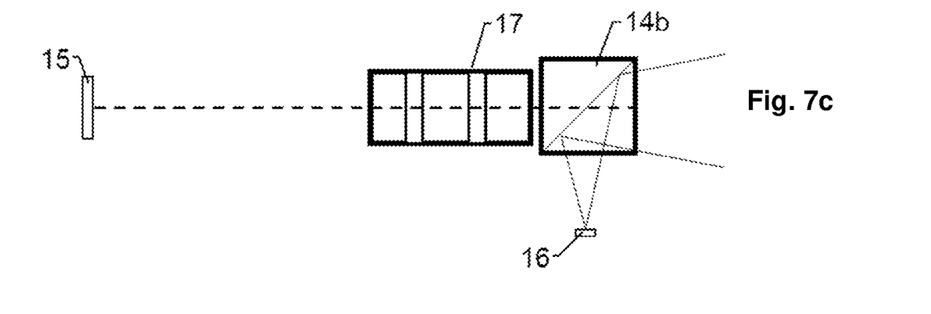

FIGS. 7a to 7c show optical systems of metrology instruments. The optical systems comprise a zoom objective 17, an illumination unit 16 and a time-of-flight sensor 15. The zoom objective 17, the illumination unit 16 and the time-of-flight sensor 15 are arranged so that their optical axes are coaxial.

FIG. 7a shows the illumination unit 16 provided by a ring illumination device, e.g. comprising an array of LEDs. The ring illumination device provides an optical axis defined by the centre of the ring. The coaxial arrangement thus is provided by arrangement of the ring so that its optical axis corresponds with the optical axes of the remaining components.

FIG. 7b shows coupling of the optical axes of the zoom objective 17, the illumination unit 16 and the time-of-flight sensor 15 by means of a 45° in-coupling mirror 14a.

FIG. 7c shows coupling of the optical axes of the zoom objective 17, the illumination unit 16 and the time-of-flight sensor 15 by means of a semi-transparent beam splitter 14b.

In some embodiments the 45° in-coupling mirror 14a or the semi-transparent beam splitter 14b can alternatively be provided between the zoom objective 17 and the time-of-flight sensor 15.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A metrology system comprising:
   a target object,
   metrology instrument for tracking the target object and/or for determining at least an orientation of the target object, the metrology instrument comprises:
   a base unit,
   a support unit mounted on the base unit and configured for being rotatable relative to the base unit around a yaw axis,
   a targeting unit mounted on the support unit and configured for being rotatable relative to the support unit around a pitch axis,
   an angle determining unit configured to provide angle determination data for determining an alignment of the targeting unit and
   a distance measuring device configured to provide distance data with respect to the target object, and
   a control unit configured for controlling an alignment of the targeting unit and for deriving at least an orientation of the target object,
   wherein the metrology instrument comprises:
   a zoom objective,
   an illumination unit and
   a time-of-flight sensor comprising an array of pixels and capable of providing range data for each pixel of the array as point cloud data, the time-of-flight sensor provides the distance measuring device,
   wherein the zoom objective, the illumination unit and the time-of-flight sensor are arranged so that an optical axis of the zoom optics, an optical axis of the illumination unit and an optical axis of the time-of-flight sensor are coaxial and an orientation of the coaxial axes is alignable by means of the targeting unit,
   the target object provides particular characteristics at the target object,
   the control unit comprises an object determination functionality which, when executed, provides:
   receiving the point cloud data provided by the time-of-flight sensor,
   deriving a digital representation of the target object by processing the point cloud data,
   comparing the digital representation of the target object with a reference pattern of the target object, the reference pattern is related to the characteristics of the target object, and
   determining the orientation of the target object based on the comparison of the digital representation of the target object with the reference pattern.

2. The metrology system according to claim 1, wherein the characteristics of the target object are provided by:
   a shape and/or a dimension of the target object, and/or
   an asymmetrical shape of the target object, and/or
   particular orientation elements arranged at the target object.

3. The metrology system according to claim 1, at least one orientation element,
   comprises an ellipsoidal, parabolic, spherical or curved shape and/or
   is embodied as a spherical or half-spherical body which defines a spherical or half-spherical elevations and/or depressions at the target.

4. The metrology system according to claim 1, wherein when executed, the object determination functionality provides computing a digital model of at least a part of the target object based on the point cloud data, the computed digital model is the digital representation of the target object.

5. The metrology system according to claim 4, wherein when executed, the object determination functionality provides fitting of the computed digital model to the reference pattern with respect to an orientation of the computed digital model, in particular also with respect to a scaling of the computed digital model.

6. The metrology system according to claim 5, wherein when executed, the object determination functionality:
provides information about an orientation and/or position of the target object based on the fitting of the computed digital model, in particular an orientation with reference to the metrology instrument, and/or
provides determining a transformation matrix based on the fitting, the transformation matrix provides information about an orientation of the target object, in particular an orientation and/or position with reference to the metrology instrument.

7. The metrology system according to claim 5, wherein the fitting of the computed digital model comprises:
based on the point cloud data or based on the computed digital model, identifying and extracting particular characteristics of the target object,
deriving a number of fitting points related to the identified and extracted particular characteristics, in particular deriving focal points and/or centre points of ellipsoidal, parabolic and/or spherical shaped characteristics representing the fitting points,
fitting the fitting points to respective pattern reference points provided by the reference pattern.

8. The metrology system according to claim 1, wherein a digital reference model of at least a part of the target object is provided as the reference pattern, wherein the digital reference model provides information about dimension and shape of the target object, in particular about dimensions and shapes of the characteristics and their positions at the target object.

9. The metrology system according to claim 8, wherein the digital reference model provides the pattern reference points and fitting of the computed digital model is performed with respect to the digital reference model, in particular wherein the pattern reference points provide positions of focal points and/or centre points of ellipsoidal, parabolic and/or spherical shaped characteristics with respect to the target object.

10. The metrology system according to claim 1, wherein the target object comprises a high-reflectivity coating, the high-reflectivity coating is designed to reflect light emitted by the illumination unit, in particular wherein the high-reflectivity coating comprises retro-reflecting glass powder, in particular wherein at least one particular characteristic of the target object comprises the high-reflectivity coating.

11. The metrology system according to claim 1, wherein when executed, the object determination functionality provides:
deriving a distance between the metrology instrument and the target object by processing of the point cloud data, and/or
deriving six degrees of freedom (6DOF) of the target object by processing of the point cloud data.

12. The metrology system according to claim 1, wherein:
the target object comprises a set of 2D markers and
the metrology instrument comprises an image sensor, in particular wherein the image sensor is provided by the time-of-flight sensor,
wherein the control unit comprises a coarse orientation determination functionality which, when executed, provides:
capturing a marker image of at least a part of the set of 2D markers,
processing the marker image and determining marker image positions for the captured markers and
deriving an orientation of the target object based on the marker image positions.

13. A metrology instrument for tracking a target object and/or for determining at least an orientation of the target object, the metrology instrument comprises:
a base unit,
a support unit mounted on the base unit and configured for being rotatable relative to the base unit around a yaw axis,
a targeting unit mounted on the support unit and configured for being rotatable relative to the support unit around a pitch axis,
an angle determining unit configured to provide angle determination data for determining an alignment of the targeting unit,
a distance measuring device configured to provide distance data with respect to the target object and
a control unit configured for controlling an alignment of the targeting unit and for deriving at least an orientation of the target object,
wherein the metrology instrument comprises
a zoom objective,
an illumination unit and
a time-of-flight sensor comprising an array of pixels and capable of providing range data for each pixel of the array as point cloud data, the time-of-flight sensor provides the distance measuring device,
wherein the zoom objective, the illumination unit and the time-of-flight sensor are arranged so that an optical axis of the zoom optics, an optical axis of the illumination unit and an optical axis of the time-of-flight sensor are coaxial and an orientation of the coaxial axes is alignable by means of the targeting unit,
the control unit comprises an object determination functionality which, when executed, provides:
receiving the range data providable by the time-of-flight sensor as point cloud data,
deriving a digital representation of the target object by processing the point cloud data,
comparing the digital representation of the target object with a reference pattern, the reference pattern providing particular characteristics of the target object,
determining an orientation of the target object based on the comparison of the digital representation of the target object with the reference pattern.

14. The metrology instrument according to claim 13, wherein the metrology instrument is a tracker and the control unit comprises a tracking functionality which, when executed, provides:
tracking a movement of the target object by continuously processing the point cloud data and providing respective tracking information and
controlling the alignment of the targeting unit based on the tracking information so that the object maintains at least partly in a field of view of the time-of-light sensor, and/or
at least the zoom objective and the time-of-flight sensor provide a defined measuring range for measuring and/or tracking the target object and
the control unit comprises a zooming functionality which, when executed, provides for each distance out of the defined measuring range varying a magnification factor of the zoom objective as a function of the distance to the target object so that the target object is imaged onto the time-of-light sensor so that a dimension of the image of the target object on the time-of-light sensor remains constant.

15. A method for determining at least an orientation of a target object by means of a tracker, the method comprises:
provolving the metrology system of claim 1,
emitting illumination light towards the target object along the optical axis,
coaxially receiving illumination light reflected by the target object along the optical axis,
capturing a time-of-flight image of the target object by means of the reflected illumination light, the time-of-flight image comprises
image information related to the target object, the image information comprises a defined amount of pixels,
range data related to the target object, wherein a distance is provided for each pixel of the defined amount of pixels,
providing the point cloud data based on the range data,
deriving the digital representation of the target object by processing the point cloud data,
comparing the digital representation of the target object with the reference pattern, the reference pattern provides the characteristics of the target object, and
determining the orientation of the target object based on the comparison of the digital representation of the target object with the reference pattern.

16. A computer program product comprising program code which is stored on a non-transitory machine-readable medium, and has computer-executable instructions for performing, when run on a control unit of the metrology system of claim 1, at least the following steps:
Receiving the point cloud data provided by the time-of-flight sensor,
deriving the digital representation of the target object by processing the point cloud data,
comparing the digital representation of the target object with the reference pattern, the reference pattern provides the characteristics of the target object, and
determining the orientation of the target object based on the comparison of the digital representation of the target object with the reference pattern.

17. A method for determining at least an orientation of a target object by means of a tracker, the method comprises:
providing the metrology instrument of claim 13,
emitting illumination light towards the target object along the optical axis,
coaxially receiving illumination light reflected by the target object along the optical axis,
capturing a time-of-flight image of the target object by means of the reflected illumination light, the time-of-flight image comprises
image information related to the target object, the image information comprises a defined amount of pixels,
range data related to the target object, wherein a distance is provided for each pixel of the defined amount of pixels,
providing the point cloud data based on the range data,
deriving the digital representation of the target object by processing the point cloud data,
comparing the digital representation of the target object with the reference pattern, the reference pattern provides the characteristics of the target object, and
determining the orientation of the target object based on the comparison of the digital representation of the target object with the reference pattern.

18. A computer program product comprising program code which is stored on a non-transitory machine-readable medium, and has computer-executable instructions for performing, when run on a control unit of the metrology instrument of claim 13, at least the following steps:
receiving the point cloud data provided by the time-of-flight sensor,
deriving the digital representation of the target object by processing the point cloud data,
comparing the digital representation of the target object with the reference pattern, the reference pattern provides the characteristics of the target object, and
determining the orientation of the target object based on the comparison of the digital representation of the target object with the reference pattern.

\* \* \* \* \*